United States Patent [19]
Gannon

[11] Patent Number: 6,044,313
[45] Date of Patent: Mar. 28, 2000

[54] METHOD AND APPARATUS FOR MONITORING TON-MILES-PER-HOUR FOR TIRES ON A MOBILE MACHINE

[75] Inventor: Julie A. Gannon, Washington, Ill.

[73] Assignee: Caterpillar Inc., Peoria, Ill.

[21] Appl. No.: 08/978,935

[22] Filed: Nov. 26, 1997

[51] Int. Cl.$^7$ ..................................................... G06F 7/70
[52] U.S. Cl. ............................. 701/29; 701/50; 152/153; 152/527; 177/136; 177/141; 104/88.04; 104/130.07; 702/173; 702/174
[58] Field of Search .................................. 701/29, 30, 31, 701/50, 35; 152/526, 527, 536–538, 153, 559, 417, 450, 521; 340/436, 439; 702/173, 187, 101, 174; 177/141, 139, 136; 104/88.04, 124, 130.07, 139, 298, 299, 300, 31, 48

[56] References Cited

U.S. PATENT DOCUMENTS

| | | |
|---|---|---|
| 4,077,454 | 3/1978 | Niyoshi et al. .......................... 152/527 |
| 4,343,338 | 8/1982 | Hart ......................................... 152/153 |
| 4,620,580 | 11/1986 | Groezinger et al. ..................... 152/153 |
| 4,635,739 | 1/1987 | Foley et al. ............................... 177/45 |
| 4,852,674 | 8/1989 | Gudat ...................................... 177/141 |
| 5,174,214 | 12/1992 | Oda et al. ................................. 104/282 |
| 5,182,712 | 1/1993 | Kyrtsos et al. ..................... 364/424.07 |
| 5,327,347 | 7/1994 | Hagenbuch ........................ 364/424.07 |
| 5,416,706 | 5/1995 | Hagenbuch ............................... 701/50 |
| 5,631,832 | 5/1997 | Hagenbuch ............................... 701/50 |

OTHER PUBLICATIONS

Ton–Miles–Per Hour literature from Goodyear, No Date.

Primary Examiner—Jacques H. Louis-Jacques
Attorney, Agent, or Firm—Steve D. Lundquist

[57] ABSTRACT

A method and apparatus to monitor ton-miles-per-hour on a plurality of tires on a mobile machine as the mobile machine hauls a load by determining the weight of the load on the tires, determining the ground speed of the mobile machine, and compensating for uneven distribution of the load on the tires. The ton-miles-per-hour is calculated for each tire as a function of the load distribution and the ground speed.

18 Claims, 6 Drawing Sheets

US 6,044,313

METHOD AND APPARATUS FOR MONITORING TON-MILES-PER-HOUR FOR TIRES ON A MOBILE MACHINE

TECHNICAL FIELD

The present invention relates generally to a method and apparatus to monitor ton-miles-per-hour on a mobile machine and, more particularly, to a method and apparatus to compensate for variations in load distribution to monitor ton-miles-per-hour for each tire on a mobile machine.

BACKGROUND ART

As a mobile machine, e.g., truck, travels, the tires on the machine generate heat due to the friction of the tires on the surface the machine is traveling on. The heat generated is a function of the load being carried by the mobile machine and the speed that the machine travels. Tire wear can be attributed to the generation of heat for long periods of time. In addition, excessive amounts of heat generation can lead to early tire failure.

Currently, ton-miles-per-hour, a standard indicator in the tire industry of the heat generated in a tire during use, is determined by calculating the average tire load and the average speed of a mobile machine, and multiplying the two averages to get an "average" ton-miles-per-hour figure. For example, in U.S. Pat. No. 5,327,347, Hagenbuch discloses a system in which ton-miles-per-hour is calculated when there is a change in weight of a vehicle, e.g., after a load or a dump. The speed of the vehicle is determined by dividing the distance traveled by the time of travel.

However, calculating "average" ton-miles-per-hour does not give a good indication of the wear on a tire during operation. Ton-miles-per-hour is directly correlated to the heat generated by a tire that carries a specified load at a specified ground speed which, in turn, is directly correlated to tire wear. For accurate monitoring of tire wear, the load and ground speed must be monitored in real time. For example, an operator driving at excessive speeds while hauling a full load generates a ton-miles-per-hour factor higher than an operator driving at a slower speed while carrying the same load. The higher ton-miles-per-hour figure may exceed the rating of the tire, resulting in excessive wear on the tires. Calculating an average ton-miles-per-hour does not account for excessive tire wear during intervals of high speed driving.

In addition, calculating an average ton-miles-per-hour figure does not take into account uneven distribution of loads on a mobile machine, which would cause the ton-miles-per-hour to vary significantly from tire to tire. For example, a truck hauling a load may have more weight from the load over the rear tires than the front tires. This would result in ton-miles-per-hour figures that are higher for the rear tires than for the front tires. Therefore, the rear tires would experience more tire wear due to heat and load than the front tires. The averaging methods described above would not account for this uneven tire wear.

The present invention is directed to overcoming one or more of the problems as set forth above.

DISCLOSURE OF THE INVENTION

In one aspect of the present invention a method for monitoring ton-miles-per-hour of a plurality of tires on a mobile machine is disclosed. The method includes the steps of determining the weight of a load on the tires, determining the speed of the mobile machine, and compensating for uneven distribution of the load on the tires. The method also includes the step of calculating the ton-miles-per-hour of the tires as a function of the load distribution and the speed.

In another aspect of the present invention an apparatus for monitoring ton-miles-per-hour of a plurality of tires on a mobile machine is disclosed. The apparatus includes a payload monitor, a speed monitor, and a control system. The control system is adapted to receive signals from the payload monitor and the speed monitor, compensate for uneven distribution of a load on the tires, and responsively determine the ton-miles-per-hour of the tires.

BEST MODE FOR CARRYING OUT THE INVENTION

Figure 1:
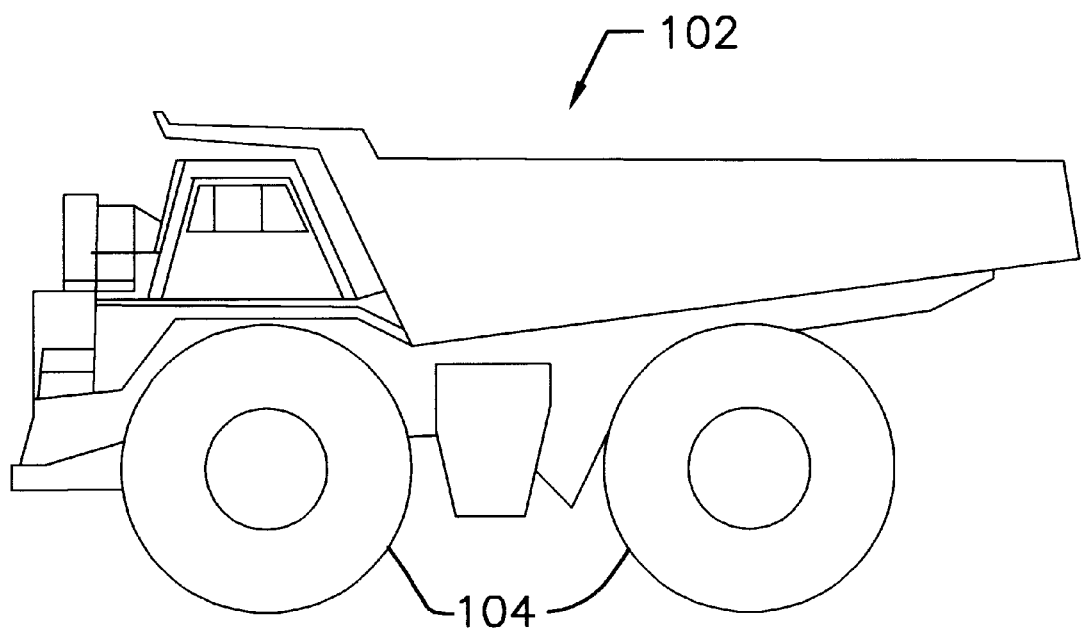
FIG. 1 is a diagrammatic illustration of a mobile machine used to haul a load.

Referring to the drawings, a method and apparatus for monitoring ton-miles-per-hour of a plurality of tires on a mobile machine as the mobile machine hauls a load is shown.

Figure 2:
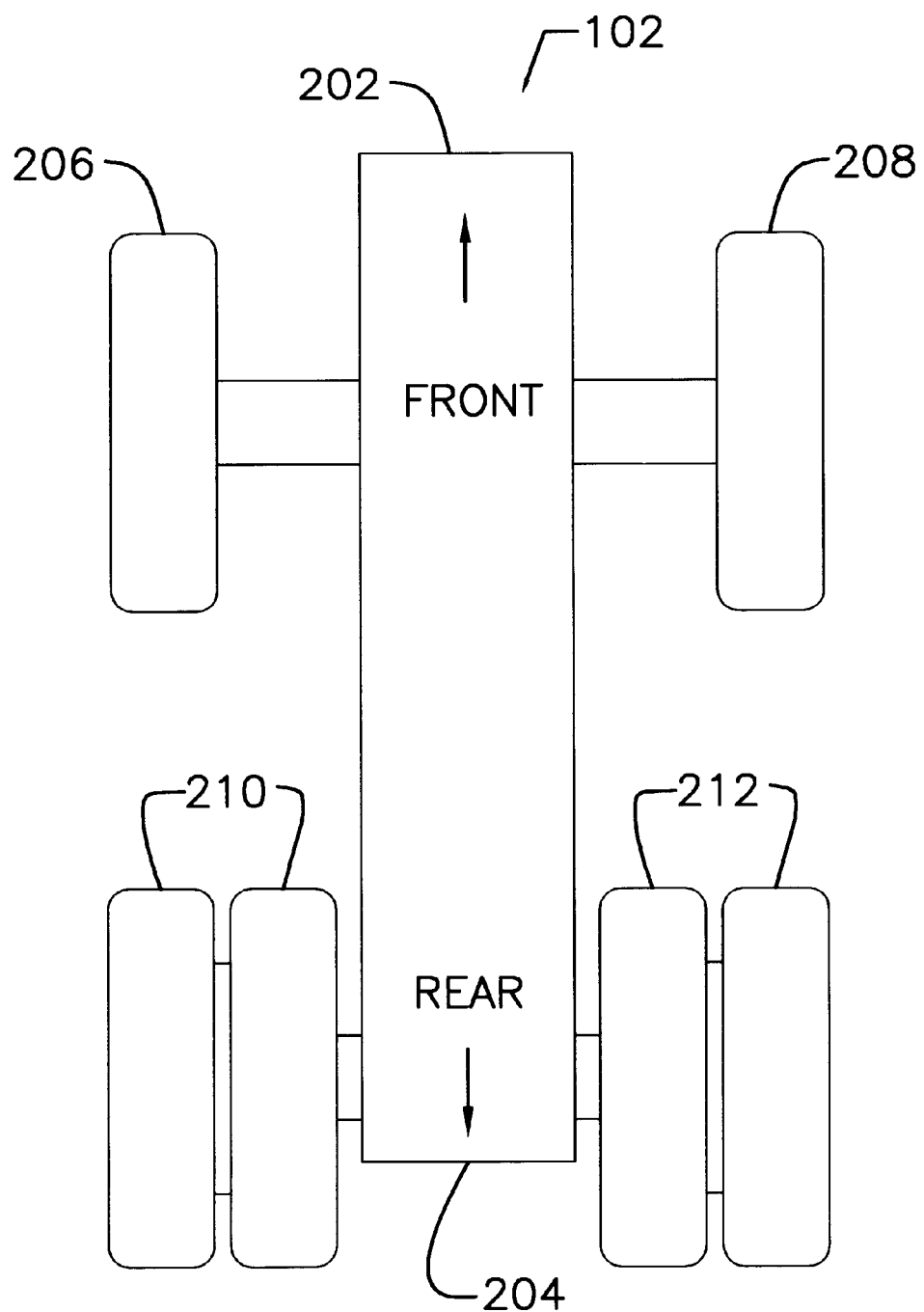
FIG. 2 is a diagrammatic illustration of a top view of a portion of a mobile machine.

With particular reference to FIGS. 1 and 2, a mobile machine 102 is shown. The mobile machine 102 in FIG. 1 is depicted as an off-road mining truck. However, other types of mobile machines, e.g., on highway trucks, wheel loaders, road reclaimers, scrapers, and the like, may be used with the present invention.

The mobile machine 102 includes a plurality of tires 104 to enable the mobile machine 102 to move about. As shown in FIG. 2, the mobile machine 102 has at least one left front tire 206, at least one front right tire 208, at least one left rear tire 210, and at least one right rear tire 212. In particular, the embodiment of FIG. 2 has one left front tire 206 and one right front tire 208, and two left rear tires 210 and two right rear tires 212. However, other combinations of tire arrangements would also apply to the present invention. For example, the mobile machine 102 may have more than one set of tires at either the front or the rear. As an example, the mobile machine 102 may have two sets of tires, e.g., dual axles, at the rear of the mobile machine 102.

Figure 3:
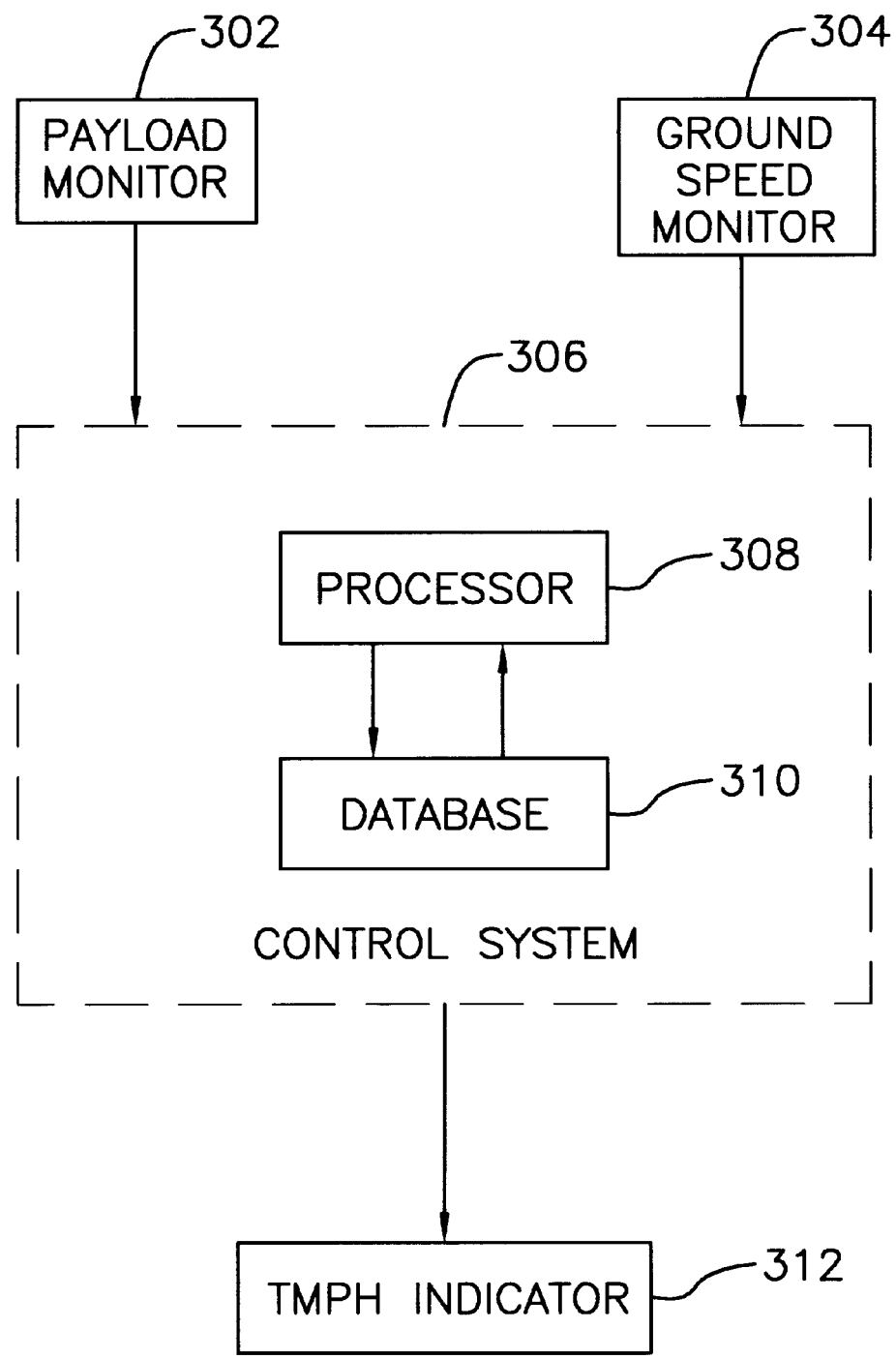
FIG. 3 is a block diagram illustrating an apparatus of the present invention.

Referring now to FIG. 3, a block diagram of an embodiment of the present invention is shown.

A payload monitor 302 detects the weight of a load on the mobile machine 102. Examples of payload monitors include strut pressure monitors, truck bed pressure monitors, hydraulic cylinder and linkage pressure monitors, and the like. An exemplary payload monitor is disclosed in U.S. Pat. No. 4,635,739, where Foley et al. monitor payload by measuring the pressure of fluids contained in the suspension struts of a mobile machine. Payload monitors are well known in the art and will not be discussed further.

A ground speed monitor 304 is used to determine the speed of the mobile machine 102 as the machine travels.

Preferably, the ground speed monitor 304 senses the output speed of a transmission on the mobile machine 102. However, the ground speed can be measured at other locations on the mobile machine 102, e.g., wheels, driveshaft, etc.

The payload monitor 302 and ground speed monitor 304 generate respective payload and ground speed signals, which are delivered to a control system 306. The control system 306 includes a processor 308, preferably a microprocessor, and a database 310. The database 310 is used to store and retrieve data by the processor 308.

The control system 306 is configured to deliver ton-miles-per-hour values to a tons-miles-per-hour (TMPH) indicator 312 located on the mobile machine 102. The TMPH indicator 312 displays a value of tons-miles-per-hour to an operator. Alternatively, the TMPH indicator 312 may be located at a remote site. Values of tons-miles-per-hour may be transmitted through a medium such as an RF link (not shown). The TMPH indicator 312 may be any of a variety of display types, including graphic, numeric, warning light, etc.

Figure 4:
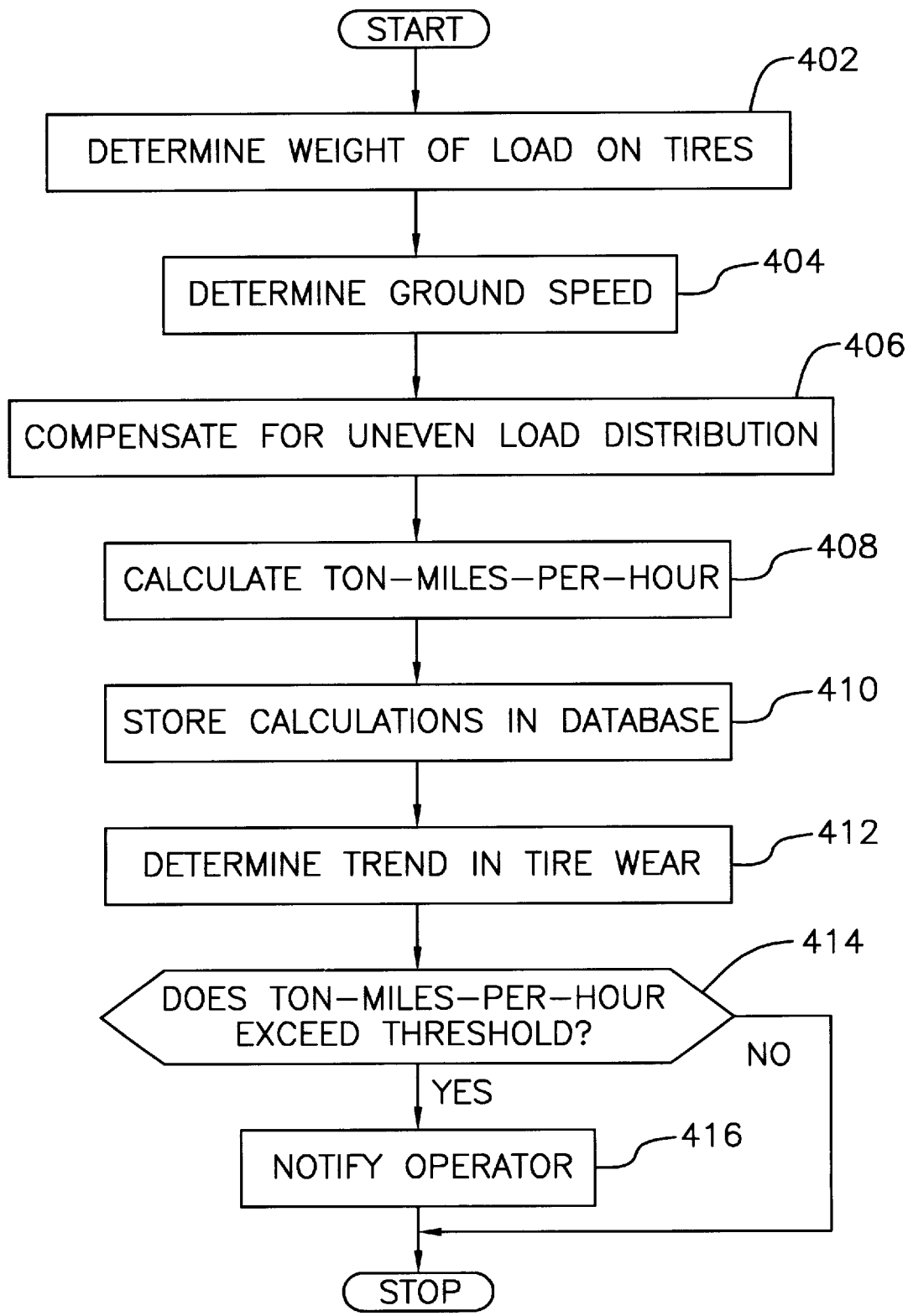
FIG. 4 is a flow diagram illustrating a method of the present invention.
Figure 5:
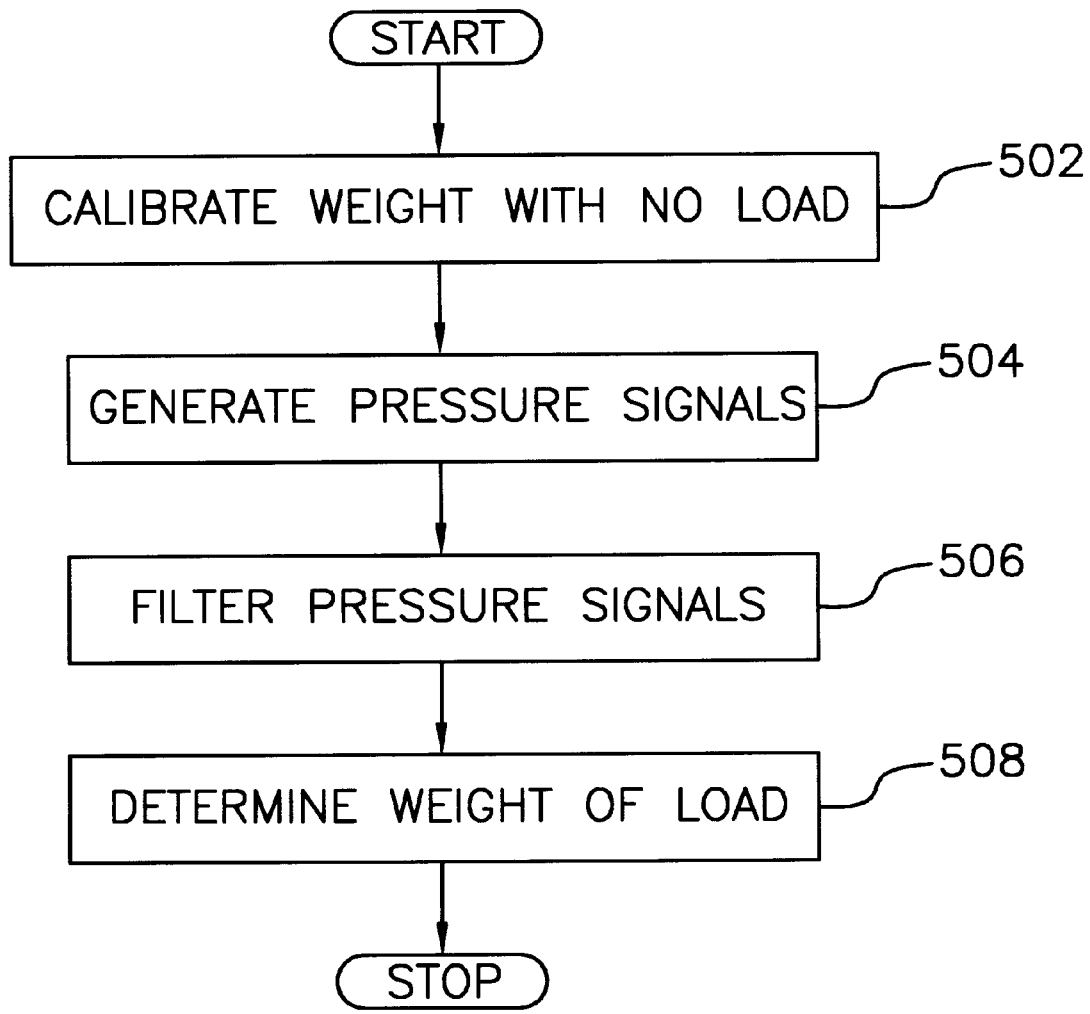
FIG. 5 is a flow diagram illustrating a method of determining the weight of a load.

Referring to FIGS. 4 and 5, flow diagrams illustrating a method for monitoring tons-miles-per-hour are shown.

In a first control block 402 in FIG. 4, the weight of a load on the tires 104 is determined. In one embodiment, the weight of the load is measured by a payload monitor 302 directly. An alternate embodiment is described below with reference to FIG. 5.

In a second control block 404, the ground speed of the mobile machine 102 is determined. Control then proceeds to a third control block 406, where compensation is performed for uneven load distributions on the tires 104. This step is desired because typical load hauling mobile machines are not configured for uniform load distributions. For example, an off road mining truck may be designed to carry 60% of a load over the rear tires and the remaining 40% of the load over the front tires to achieve stability during transport.

In a fourth control block 408, the processor 308 in the control system 306 calculates the ton-miles-per-hour for each tire 104 as a function of the load distribution and the ground speed. The ton-miles-per-hour is calculated by a variety of embodiments.

In the first embodiment, the ton-miles-per-hour for the front tires of 206,208 and the ton-miles-per-hour for the rear tires 210,212 are calculated by multiplying the load by the ground speed by respective front and rear load distribution ratios. For the 60%/40% ratios described above, the equations would be:

$$TMPH_{REAR}=(EVW+PAYLOAD)*GROUND\ SPEED*0.6 \quad (Eq.\ 1)$$

$$TMPH_{FRONT}=(EVW+PAYLOAD)*GROUND\ SPEED*0.4 \quad (Eq.\ 2)$$

where EVW is the empty vehicle weight of the mobile machine 102.

In a second embodiment, the front and rear weight distribution ratios may be different for no load conditions than for full load conditions. The difference compensates for conditions where adding a load causes the distribution of the weight on the tires 104 to change. For example, the load distribution for an empty off road mining truck may be 50% over the rear tires and 50% over the front tires. However, when a load is added, the load distribution may change to 67% over the rear tires and 33% over the front tires. Since an off road mining truck will travel as much empty as loaded, the change in load distribution will have a substantial effect on ton-miles-per-hour calculations.

The equations for the second embodiment are:

$$TMPH_{REAR}=(EVW+PAYLOAD)*GROUND\ SPEED*K_{REAR} \quad (Eq.\ 3)$$

$$TMPH_{FRONT}=(EVW+PAYLOAD)*GROUND\ SPEED*K_{FRONT} \quad (Eq.\ 4)$$

where, using the above example, $K_{REAR}$ is 0.5 empty and 0.67 loaded, and $K_{FRONT}$ is 0.5 empty and 0.33 loaded.

A third embodiment of the present invention is shown with reference to FIG. 5. In a first control block 502, the weight of the mobile machine 102 is determined by the payload monitor 302 with no load. The weight is then calibrated to produce a calibration constant K to set the payload at no load to zero as shown by the following equation:

$$PAYLOAD=0=k_f(LF_{EMPTY}+RF_{EMPTY})+k_r(LR_{EMPTY}+RR_{EMPTY})+K \quad (Eq.\ 5)$$

where $k_f$ and $k_r$ are front and rear strut pressure to payload conversion constants, respectively.

The payload when a load is added is then determined by:

$$PAYLOAD=k_f(\Delta LF+\Delta RF)+k_r(\Delta LR+\Delta RR)+K \quad (Eq.\ 6)$$

where the symbol $\Delta$ indicates that the strut pressures LF, RF, LR, and RR are the changes in strut pressures from no load.

In a second control block 504, a set of pressure signals are generated by the payload monitor 302 in response to the pressure created by a load added to the mobile machine 102. The pressure signals are delivered to the control system 306 where, in a third control block 506, the pressure signals are filtered using standard signal filtering techniques to remove noise, spikes, and the like. The signal components that are filtered may be caused by noise common to electronic signal generators, and may also be the result of pressure fluctuations in the payload monitor 302 caused by bumps and holes on a road surface as the mobile machine 102 travels over the road.

The filtered pressure signals are then used to determine the distribution of the payload on the mobile machine 102, preferably using one of the distribution embodiments described above. For example, the payload at each of the tires 104 for the front and rear tires on the mobile machine 102 may be determined by:

$$PAYLOAD_{FRONT} = \frac{\left[ \begin{array}{c} (0.33*PAYLOAD)+ \\ k_f(\Delta LF_{FILTERED}+\Delta RF_{FILTERED}) \end{array} \right]}{\text{NUMBER OF FRONT TIRES}} \quad (Eq.\ 7)$$

and $$PAYLOAD_{REAR} = \frac{\left[ \begin{array}{c} (0.67*PAYLOAD)+ \\ k_r(\Delta LR_{FILTERED}+\Delta RR_{FILTERED}) \end{array} \right]}{\text{NUMBER OF REAR TIRES}} \quad (Eq.\ 8)$$

where 0.33 and 0.67 are exemplary ratios of load distribution from front to rear of the mobile machine. The terms $\Delta XX_{FILTERED}$ account for changes in load distribution as the mobile machine 102 travels due to bumps, potholes, and the slopes of grades.

The ton-miles-per-hour for the front and rear tires can then be determined by:

$$TMPH_{FRONT}=(EVW+PAYLOAD_{FRONT})*GROUND\ SPEED \quad (Eq.\ 9)$$

and $$TMPH_{REAR}=(EVW+PAYLOAD_{REAR})*GROUND\ SPEED \quad (Eq.\ 10).$$

In a fourth embodiment, the ton-miles-per-hour is determined for each tire by factoring in load distributions for left and right tires, in addition to the load distributions for front and rear sets of tires. Exemplary equations for ton-miles-per-hour are:

$$TMPH_{LF} = \text{GROUND SPEED} * \qquad \text{(Eq 11)}$$
$$(EVW + PAYLOAD_{FRONT})\left(\frac{\Delta LF_{FILTERED}}{\Delta LF_{FILTERED} - \Delta RF_{FILTERED}}\right)$$

$$TMPH_{RF} = \text{GROUND SPEED} * \qquad \text{(Eq 12)}$$
$$(EVW + PAYLOAD_{FRONT})\left(\frac{\Delta RF_{FILTERED}}{\Delta RF_{FILTERED} - \Delta LF_{FILTERED}}\right)$$

$$TMPH_{LR} = \text{GROUND SPEED} * \qquad \text{(Eq 13)}$$
$$(EVW + PAYLOAD_{REAR})\left(\frac{\Delta LR_{FILTERED}}{\Delta LR_{FILTERED} - \Delta RR_{FILTERED}}\right)$$

$$TMPH_{RR} = \text{GROUND SPEED} * \qquad \text{(Eq 14)}$$
$$(EVW + PAYLOAD_{REAR})\left(\frac{\Delta RR_{FILTERED}}{\Delta RR_{FILTERED} - \Delta LR_{FILTERED}}\right)$$

If there are more than two tires on the front or rear, e.g., the rear tires 210,212 may have two tires per side, the appropriate equation is divided by the number of tires on each side.

In a fifth embodiment, the calibration constant K in Equation 5 can be determined for each of the sets of tires on the mobile machine 102, i.e., left front, right front, left rear, and right rear. This method would result in four calibration equations with four calibration constants as shown by:

$$0 = (k_f * LF_{EMPTY}) + K_{LF} \qquad \text{(Eq. 15)}$$
$$0 = (k_f * RF_{EMPTY}) + K_{RF} \qquad \text{(Eq. 16)}$$
$$0 = (k_r * LR_{EMPTY}) + K_{LR} \qquad \text{(Eq. 17)}$$
$$0 = (k_r * RR_{EMPTY}) + K_{RR} \qquad \text{(Eq. 18)}$$

Payload can then be determined by:

$$PAYLOAD = k_f(\Delta LF + \Delta RF) + k_r(\Delta LR + \Delta RR) + (K_{LF} + K_{RF} + K_{LR} + K_{RR}) \qquad \text{(Eq. 19)}$$

The ton-miles-per-hour values for each tire can then be determined by:

$$TMPH_{LF} = \frac{[(k_f * \Delta LF + K_{LF}) * \text{GROUND SPEED}]}{\text{NUMBER OF LEFT FRONT TIRES}} \qquad \text{(Eq. 20)}$$

$$TMPH_{RF} = \frac{[(k_f * \Delta RF + K_{RF}) * \text{GROUND SPEED}]}{\text{NUMBER OF RIGHT FRONT TIRES}} \qquad \text{(Eq. 21)}$$

$$TMPH_{LR} = \frac{[(k_r * \Delta LR + K_{LR}) * \text{GROUND SPEED}]}{\text{NUMBER OF LEFT REAR TIRES}} \qquad \text{(Eq. 22)}$$

$$TMPH_{RR} = \frac{[(k_r * \Delta RR + K_{RR}) * \text{GROUND SPEED}]}{\text{NUMBER OF RIGHT REAR TIRES}} \qquad \text{(Eq. 23)}$$

It is to be understood that the embodiments described above are exemplary methods for compensating the payload on a mobile machine 102 for uneven load distribution. Variations of the above equations may be used without deviating from the spirit of the present invention.

Referring again to FIG. 4, in a fifth control block 410, the ton-miles-per-hour calculations are stored in a database 310. The calculations are performed on a predetermined periodic basis. For example, it may be desired to perform the ton-miles-per-hour calculations ten times per second (10 Hz.), average the calculations once per hour, and store the averages in the database 310 as the mobile machine 102 travels. However, the calculations may be performed more frequently or less frequently, as desired.

The calculations stored in the database 310 may be used to determine trends or patterns of tire wear based on excessive values of ton-miles-per-hour. Tire wear may be attributed to driver performance or road conditions. An example of an evaluation of ton-miles-per-hour is illustrated in the scatter plot shown in FIG. 6 and is described in more detail below. Additionally, the data can be incorporated into a histogram and analyzed over time to determine trends in tire wear, as shown in a sixth control block 412. Trending of data is well known in the art and will not be discussed further.

In a first decision block 414, the calculated values of ton-miles-per-hour are monitored to determine if a predetermined threshold is exceeded. For example, an operator may determine that it is desired not to exceed a certain value of ton-miles-per-hour to avoid excessive wear on tires. If the value of ton-miles-per-hour exceeds the predetermined threshold, the operator is notified in a seventh control block 416 by the TMPH indicator 312.

INDUSTRIAL APPLICABILITY

As an example of an application of the present invention, off road mining trucks carry loads of material from dig sites to dump sites, e.g., crushers, windrow dumps, and the like. After dumping, the mining trucks return to the dig sites carrying no loads. The travel time of the mining trucks may be divided equally between full load and no load.

The trucks are designed to distribute loads in an uneven fashion to improve handling characteristics. For example, when fully loaded, the load distribution may be 30% over the front tires and 70% over the rear tires. However, when empty, the weight distribution of the trucks may be 50% over the front tires and 50% over the rear tires.

Ton-miles-per-hour is a well known indicator of heat generated by tires during use in the tire industry. The heat generated is also directly correlated with tire wear. Therefore, an accurate, real time monitor of ton-miles-per-hour can determine excessive tire wear. A TMPH indicator 312 can be used to notify an operator when ton-miles-per-hour exceeds a predetermined threshold, thus giving the operator an opportunity to modify driving performance to lower ton-miles-per-hour values. Accuracy of ton-miles-per-hour is improved by including the load distribution factors described above.

Figure 6:
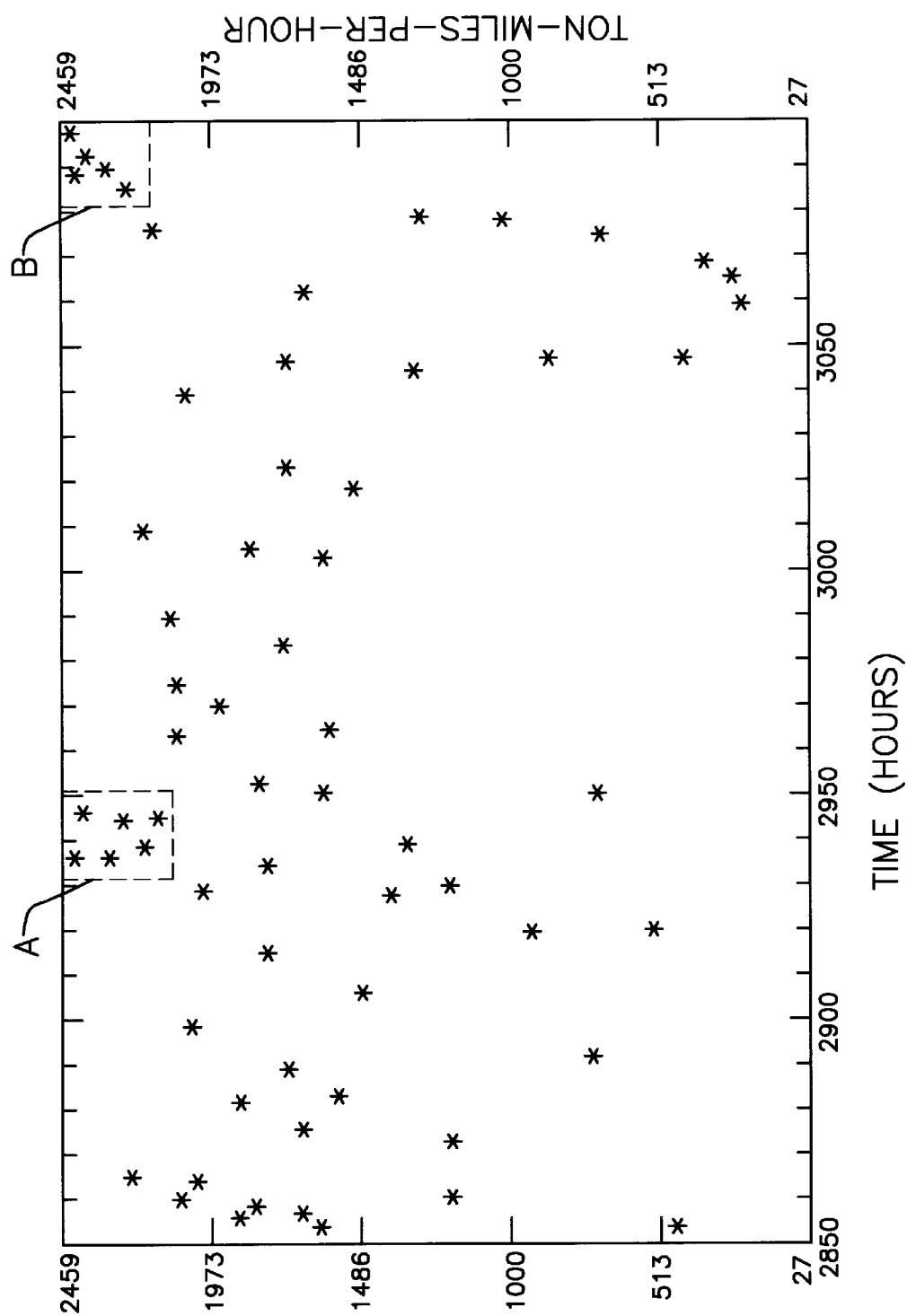
FIG. 6 is a scatter plot illustrating an example of an application of the present invention.

Referring to FIG. 6, an exemplary scatter plot of ton-miles-per-hour determined every hour for a period of about 230 hours is shown. The scatter plot may show ton-miles-per-hour for the cumulative total of tires 104 on a mobile machine 102, or multiple scatter plots may be created, one for each tire on the mobile machine 102.

In the scatter plot of FIG. 6, two clusters of points, denoted as A and B, depict periods of time where ton-miles-per-hour is considered high for prolonged periods. The clusters A and B could be interpreted as indicating an operator driving at excessive speeds during a work shift.

In addition to displaying data on scatter plots, the periodic ton-miles-per-hour calculations could be trended over time to determine driving patterns that contribute to tire wear, or to determine areas of road surfaces that contribute to tire wear.

Other aspects, objects, and features of the present invention can be obtained from a study of the drawings, the disclosure, and the appended claims.

What is claimed is:

1. A method for monitoring ton-miles-per-hour of a plurality of tires on a mobile machine as the mobile machine travels, including the steps of:

determining the weight of a load supported by the tires;

determining the ground speed of the mobile machine;

compensating the determined weight for uneven distribution of the load on the tires; and calculating the ton-miles-per-hour for each tire as a function of the compensated load distribution and the ground speed.

2. A method, as set forth in claim 1, wherein compensating for uneven distribution includes the step of multiplying the ton-miles-per-hour of a set of tires on the front of the mobile machine and the ton-miles-per-hour of a set of tires on the rear of the mobile machine by respective front and rear load distribution ratios.

3. A method, as set forth in claim 2, wherein the front and rear load distribution ratios are predetermined for a mobile machine with no load.

4. A method, as set forth in claim 2, wherein the front and rear load distribution ratios are predetermined for a mobile machine with full load.

5. A method, as set forth in claim 2, wherein the front and rear load distribution ratios are predetermined for a mobile machine with each of no load and full load.

6. A method, as set forth in claim 1, wherein determining the weight of the load supported by the tires includes the steps of:

calibrating the determined weight of the mobile machine with not load;

generating a set of pressure signals as a function of the pressure created by a load on the mobile machine;

filtering the pressure signals; and determining the weight of the load as the difference between the filtered pressure signals and the calibrated no load weight.

7. A method, as set forth in claim 6, wherein the weight of the load is determined for each of set of tires on the front of the mobile machine and a set of tires on the rear of the mobile machine.

8. A method, as set forth in claim 7, wherein the weight of the load on the set of tires on the front of the mobile machine and the weight of the load on the set of tires on the rear of the mobile machine are determined using respective front and rear load distribution ratios.

9. A method, as set forth in claim 8, wherein the weight of the load on each tire on the front of the mobile machine is determined by dividing the weight of the load on the front of the mobile machine by the number of tires on the front of the mobile machine, and wherein the weight of the load on each tire on the rear of the mobile machine is determined by dividing the weight of the load on the rear of the mobile machine by the number of tires on the rear of the mobile machine.

10. A method, as set forth in claim 8, wherein the ton-miles-per-hour for the tires on the left front of the mobile machine are determined by:

$$TMPH_{LF} = \text{GROUND SPEED} * (LOAD_{FRONT}) * \left(\frac{\Delta LF_{FILTERED}}{\Delta LF_{FILTERED} - \Delta RF_{FILTERED}}\right)$$

and wherein the ton-miles-per-hour for the tires on the right front of the mobile machine are determined by:

$$TMPH_{RF} = \text{GROUND SPEED} * (LOAD_{FRONT}) * \left(\frac{\Delta RF_{FILTERED}}{\Delta RF_{FILTERED} - \Delta LF_{FILTERED}}\right)$$

where $\Delta LF_{FILTERED}$ and $\Delta RF_{FILTERED}$ are the differences between the filtered pressure signals and the full load weights for the left front tires and the right front tires, respectively.

11. A method, as set forth in claim 8, wherein the ton-miles-per-hour for the tires on the left rear of the mobile machine are determined by:

$$TMPH_{LR} = \text{GROUND SPEED} * (LOAD_{REAR}) * \left(\frac{\Delta LR_{FILTERED}}{\Delta LR_{FILTERED} - \Delta RR_{FILTERED}}\right)$$

and wherein the ton-miles-per-hour for the tires on the right rear of the mobile machine are determined by:

$$TMPH_{RR} = \text{GROUND SPEED} * (LOAD_{REAR}) * \left(\frac{\Delta RR_{FILTERED}}{\Delta RR_{FILTERED} - \Delta LR_{FILTERED}}\right)$$

where $\Delta LR_{FILTERED}$ and $\Delta RR_{FILTERED}$ are the differences between the filtered pressure signals and the full load weights for the left rear tires and the right rear tires, respectively.

12. A method, as set forth in claim 1, including the step of storing periodic calculations of ton-miles-per-hour in a database.

13. A method, as set forth in claim 12, including the step of creating a histogram from the periodic calculations of ton-miles-per-hour in the database.

14. A method, as set forth in claim 13, including the step of determining a trend in tire wear as a function of the periodic calculations.

15. A method, as set forth in claim 1, including the step of notifying an operator in response to the calculated ton-miles-per-hour exceeding a predetermined threshold.

16. An apparatus for monitoring ton-miles-per-hour of a plurality of tires on a mobile machine as the mobile machine travels, comprising:

a payload monitor located on the mobile machine that generates a payload signal;

a ground speed monitor located on the mobile machine that generates a ground speed signal; and a control system located on the mobile machine, adapted to receive the payload signal and the ground speed signal, compensate for uneven distribution of the load on the tires, and responsively determine the ton-miles-per-hour for each tire.

17. An apparatus, as set forth in claim 16, wherein the control system includes:

a processor; and a database adapted to store the determined ton-miles-per-hour.

18. An apparatus, as set forth in claim 16, including a ton-miles-per-hour indicator located on the mobile machine and adapted to receive a ton-miles-per-hour signal from the control system and responsively display a value of ton-miles-per-hour.

* * * * *